May 20, 1952 — R. A. JOSEPH — 2,597,148
EGG WASHING MACHINE
Filed Nov. 10, 1947
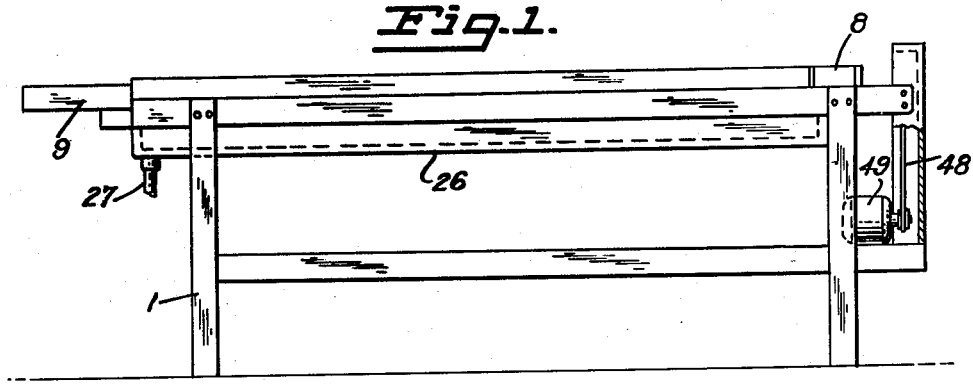
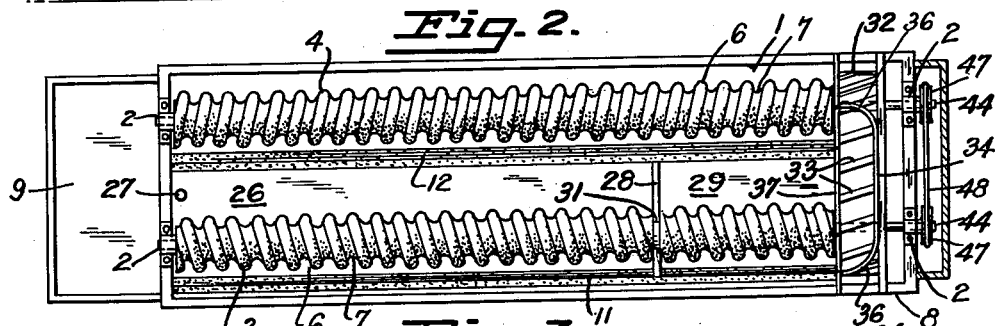
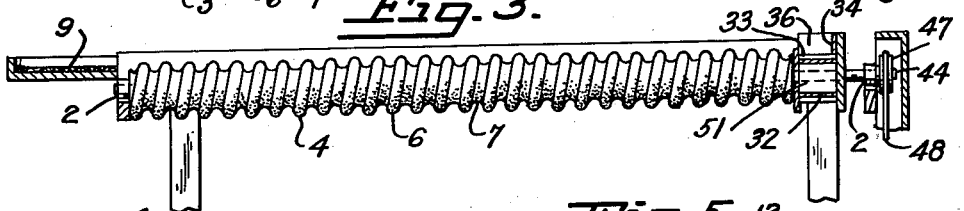
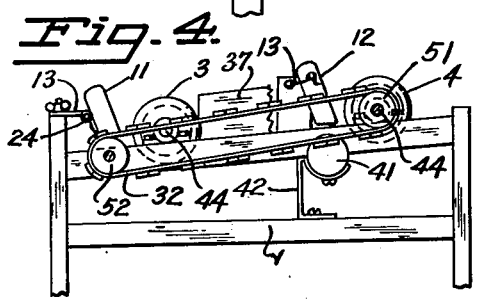
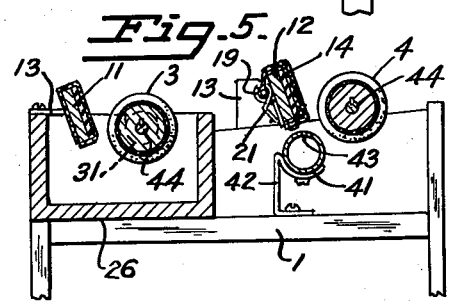
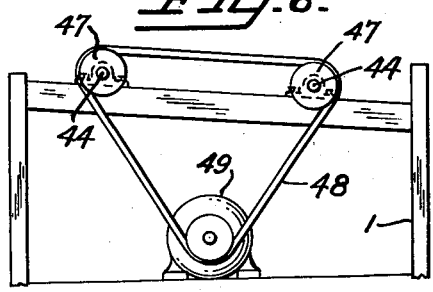
INVENTOR.
Roy A. Joseph
BY
George B White
ATTORNEY.

Patented May 20, 1952

2,597,148

UNITED STATES PATENT OFFICE 2,597,148

EGG WASHING MACHINE

Roy A. Joseph, Petaluma, Calif.

Application November 10, 1947, Serial No. 785,015

4 Claims. (Cl. 15—3.13)

This invention relates to an egg washing and drying machine.

An object of the invention is to provide in an egg washing and drying machine spiral elements to convey the eggs on adjacent baffle boards, so that the eggs are suitably rolled, rubbed and washed, means being provided for draining and dripping before the eggs are transferred and rolled on a dryer board to be dried before their discharge on to a suitable egg tray; in general providing a device in which eggs are continuously and efficiently washed, cleaned and dried.

Particular features of my egg washing and cleaning machine include: the forming of a padded board above a tank or vessel, adjacent to which a padded spiral conveyor advances the eggs, and dividing the vessel as well as the space around the conveyor so as to provide a wet side where washing fluid is applied and absorbed by the padding on both the conveyor and the board and is rubbed on the eggs, and into a dry side on the same conveyor where the moisture is allowed to drip from the eggs; a transverse conveyor to transfer the eggs to a drying conveyor and padded board on the dryer side of the machine; a control of the transfer in accordance with the speed of rotation of the drying side of the machine; the replaceability of the towelling or absorbent padding on the drying board of the machine; the efficient arrangement of the heated air supply for the drying side of the machine; and the particular structure of the padded board especially on the drying side of the machine.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a side view of my device.

Fig. 2 is a top plan view of my device.

Fig. 3 is a longitudinal sectional view of my device.

Fig. 4 is an end view of the device showing the driving mechanism for the transverse conveyor.

Fig. 5 is a cross sectional view of my device.

Fig. 6 is an end view of the device showing the driving mechanism to the rollers.

Fig. 7 is a cross sectional view on a somewhat enlarged scale showing the structure of the padding and the dryer board.

In carrying out my invention I make use of a frame 1 on the top of which in suitable journal boxes 2 are journalled a pair of parallel spaced rollers 3 and 4. Each of the rollers is formed with spiral ridges 6 and suitable spiral grooves 7 between the ridges so as to act somewhat in the nature of spiral conveyors. The so called wet roller 3 has its spiral ridges 6 so slanted that it moves the eggs toward the transfer end 8 of the machine. The dry roller 4 has its ridges 6 and spiral groove 7 slanted in the opposite direction to those of the wet roller 3 so as to move the eggs away from the transfer end 8 of the machine and to a tray holder or padded tray 9. Each of the rollers 3 and 4 is padded, namely each has a hard core around which is an absorbent padding such as towelling formed in such a way that it cushions and rubs the eggs as well as absorbs moisture.

Adjacent to the side of the wet roller 3 where the roller is rotating upwardly, is a baffle board 11. Adjacent the same side of the dry roller 4 is another baffle board 12. Each of the baffle boards 11 and 12 are inclined upwardly and away from the respective rollers 3 and 4 so that the eggs are rolled over and moved back and forth during their movement along said boards. The baffle boards 11 and 12 are supported in suitable brackets 13 which in turn are mounted on the top of the frame 1. The baffle boards 11 and 12 are also covered with absorbent padding, such as towelling 14.

The towelling 14 on the baffle board 11 is conveniently removable so that it may be easily and quickly replaced for more effective drying of the cleaned and washed eggs. The mounting of this removable towelling 14 on the baffle board 12 is accomplished by providing a plurality of holes 16 along the bottom or lower longitudinal edge of the towelling and providing suitable eyelets 17 in said holes 16. These eyelets 17 are placed over hooks 18 which latter are secured along the bottom edge of the drying board 12. The towelling is stretched over the face of the board 12 and over the top edge of the same down to the rear. The upper edge of the towelling 14 is rolled into a holder for a metal rod 19, which is gripped in spring clamps 21 mounted at spaced points on the back of the board 12. In this manner the towelling 14 can be stretched over the board at will. In order to keep the board dry for the drying operation, the absorbent padding 14 has under it a cushion 22 which is on the face of the board 12. This cushion is made in the herein illustration in the form of sponge rubber.

Then this cushion 22 as well as the top and bottom edges of the board are covered by a waterproof lining 23 which prevents water from soaking into the rubber cushion 22 or into the board 12.

The boards 11 and 12 may be held in place in any suitable manner, for instance by a hinge 24 on the bracket 13 so that on loosening the bracket the board can be easily swung into an out of the way position. The spacing between each board 11 or 12 and the respective adjacent roller 3 or 4 is such that the eggs do not fall into said space but keep on being rolled and advanced by the rotation of the rollers.

The wet roller 3 is located in a tank 26 on the frame 1, which tank contains water or suitable cleaning solution to a level to saturate the lowermost portions of the padding of the roller 13 as the latter rotates therein. The absorbed water or solution is transmitted to the eggs and the eggs are rotated and rubbed against the padded surface with a wiping action during their advance along the adjacent board 11. A suitable drain 27 is provided for draining the tank periodically.

The tank 26 is divided by a transverse partition 28 into two separate compartments. A larger compartment of the tank 26 contains the water or cleaning solution, while the smaller tank compartment 29 is dry. The partition 28 has a substantially semi-circular recess 31 to accommodate the rotating roller 3, but the recess is above the usual fluid level in the wet portion of the tank 26. While the eggs are advanced above this dry compartment 29, excess moisture from the same is allowed to drip off and be drained off from the dry compartment 29.

At the transfer end 8 of the machine, is provided a conveyor belt 32 on which are a plurality of cleats 33 inclined transversely outwardly and in the direction of the movement of the belt so that the eggs between the cleats 33 tend to move along the cleats. A shield 34 is supported above the conveyor belt 32 and above said cleats 33. The ends of the shield 34 are curved so that the curved end 36 adjacent the wet roller 3 aligns with the space where the eggs travel to allow their entry to the transfer conveyor, and the other curved end 36 aligns with the space between the drier roller 4 and the adjacent baffle 12 for driving and delivering the eggs into said space. A shield 37 is provided along the inside edge of the belt conveyor between the wet roller 3 and the dry board 12 so that the eggs are definitely guided as they are moved along by the belt conveyor from the wet roller to the path of the dry roller as shown particularly in Fig. 2.

Under the space between the dry roller 4 and its baffle board 12 is a blower conduit or pipe 41 supported in suitable brackets 42 on the frame 1. The blower pipe 41 has orifices 43 in its top through which hot air is blown into the space around the dry roller 4. The conduit 41 is connected, in any suitable manner not shown, to a blower and heater element preferably also mounted on the frame 1 to deliver heated air as required.

At the delivery end of the dry roller 4 is a tray platform 9 covered with suitable cloth or the like material to receive the eggs from the drier. Trays may be placed on this frame or the eggs may be removed from the same into the usual processing or carrying trays now in use.

The shafts 44 of the respective rollers 3 and 4 are extended through suitable bearing brackets at the transfer end 8 of the machine and have drive pulleys 47 thereon. A drive belt 48 connects the drive pulleys 47 to a suitable prime mover such as an electric motor 49 on the frame 1. The transmission is suitably boxed. The ratio or relative speed of the driving of the wet roller 3 and dry roller 4 can be determined by the size of the drive pulleys 47.

The conveyor belt 32 is driven by a drive pulley 51 mounted on the shaft 44 of the dry roller 4 so that it rotates and moves the conveyor belt 32 in accordance with the desired speed of rotation with respect to the rotation of the dry roller 4. The other end of the conveyor belt 32 moves around an idler pulley 52 suitably journalled on the top of the frame 1 as shown in Fig. 4.

The machine is simple in construction. In operation the eggs are placed by hand upon the intake end of the wet roller 3 adjacent the wet board 11 and are moved thereby so that they not only roll but are turned by these spiral ridges 6 and groove 7 of the wet roller 3 and as the eggs fall in various positions back upon the wet board 11 they turn and shift with a wiping and rolling action upon the saturated absorbent padding as they are passed along towards the dry end of the tank 26. At said dry end the eggs are allowed to drip the surplus fluid from the same and then are fed into the transverse conveyor 32, the cleats 33 of which carry the eggs between the guides and guide them into the space between the dry board 12 and the dry roller 4. Then the dry roller 4 moves, rolls and shifts the eggs along the dry board in such a manner that they are completely wiped, dried and cleaned, and then deposited on the padded end tray 9. While the eggs are passed along the dry board 12 they are subjected to the drying action of air blown from the orifices or nozzles 43 of the pipes 41 thereunder. The machine works in synchronism and after the initial adjustment it does not require any further adjustment. Its operation is continuous, the eggs are readily observable on the drying side so that in exceptional instances when the eggs were insufficiently cleaned or cleared properly the same can be removed even while in the machine and placed back upon the wet side for further washing. In the event that the dry board 7 becomes too soiled or dirty, the towelling from the same can be easily removed and replaced as heretofore described. The device by its simplicity and minimum moving parts as well as minimum adjustment, is excellently and eminently adapted for use on chicken farms and the like.

I claim:

1. In an egg washing machine of the character described, a pair of parallel spaced rollers, spiral advancing ridges thereon, an inclined baffle along the side of each roller where the roller turns upwardly, a vessel under one of said rollers containing cleaning fluid, absorbent padding on said roller dipping into said fluid to absorb and carry said fluid, and absorbent padding on the adjacent baffle spaced above said fluid to wash and wipe the egg as the egg is rolled and shifted along said baffle by said spiral ridges of said roller, the outlet of the first roller and the inlet of the other roller being at the adjacent ends of the rollers and being substantially at the same level, a transverse conveyor along the outlet end of the first roller to convey eggs to the inlet end of the next roller to transfer eggs from the first to the second roller, a guide above said transverse conveyor to guide said eggs from said outlet to said inlet, and means to drive said rollers and said transverse conveyor in synchronism.

2. In an egg washing machine of the character described, a pair of parallel spaced rollers, spiral advancing ridges thereon, an inclined baffle along the side of each roller where the roller turns upwardly, a vessel under one of said rollers containing cleaning fluid, absorbent padding on said roller to absorb and carry said fluid, absorbent padding on the adjacent baffle to wash and wipe the egg as the egg is rolled and shifted along said baffle by said spiral ridges of said roller, driving means for said rollers, and a transverse conveyor to transfer eggs from the end of the first roller to the adjacent end of the other roller, and transmission means connected to said driving means and to said transverse conveyor for driving said transverse conveyor in synchronism with said other roller.

3. In an egg washer of the character described, a washer roller and a parallel dryer roller, an absorbent pad on each roller, a baffle surface along each roller against which the eggs are rolled and shifted by the respective rollers, substantially spiral ridges on each roller for rolling and shifting the eggs along the adjacent baffle surface from one end of the roller to the other end of the roller, absorbent padding on each of said baffle surfaces, a trough under the washer roller containing a fluid communicated to said absorbent padding on said washer roller, and means under the space between the dryer roller and the adjacent baffle for passing drying air upwardly through said space and onto the eggs between said last roller and baffle, transverse conveyor means at the outlet end of the washer roller to convey eggs from said washer roller into the end of the space between the dryer roller and its board, said ends being substantially at the same level, and means to drive said rollers and said transverse conveyor in synchronism at a predetermined relative speed ratio.

4. In an egg washer of the character described, a washer roller and a parallel dryer roller, an absorbent pad on each roller, a baffle surface along each roller against which the eggs are rolled and shifted by the respective rollers, substantially spiral ridges on each roller for rolling and shifting the eggs along the adjacent baffle surface from one end of the roller to the other end of the roller, absorbent padding on each of said baffle surfaces, a trough under the washer roller containing a fluid communicated to said absorbent padding on said washer roller, dryer means to convey drying air in the space between the dryer roller and the adjacent baffle, and a transverse partition in said trough to separate the trough into two compartments, one of said compartments containing said fluid, the other compartment being dry, the absorbent padding on said first roller being divided at said partition and said spiral ridges on said first roller being at an angle for advancing the eggs from above said compartment containing fluid toward the part of the pad on said roller above said dry compartment.

ROY A. JOSEPH.

REFERENCES CITED

The following references are of record in the file of this patent:

UNITED STATES PATENTS

| Number | Name | Date |
|---|---|---|
| 499,389 | Malmfelt | June 13, 1893 |
| 1,081,367 | Cook | Dec. 16, 1913 |
| 1,101,304 | Maull | June 23, 1914 |
| 1,451,200 | Boyle | Apr. 10, 1923 |
| 1,928,339 | Mulvaney | Sept. 26, 1933 |
| 2,039,280 | Brogden | May 5, 1936 |
| 2,078,941 | Guignard | May 4, 1937 |
| 2,087,844 | Hansen | July 20, 1937 |
| 2,295,918 | Thomas | Sept. 15, 1942 |
| 2,357,892 | Grant | Sept. 12, 1944 |
| 2,438,666 | Hodson | Mar. 30, 1948 |

FOREIGN PATENTS

| Number | Country | Date |
|---|---|---|
| 26,721 | Great Britain | Nov. 17, 1909 |
| 271,237 | Great Britain | May 26, 1927 |